(No Model.)
J. J. FLETCHER.
EGG BEATER.
No. 442,429. Patented Dec. 9, 1890.
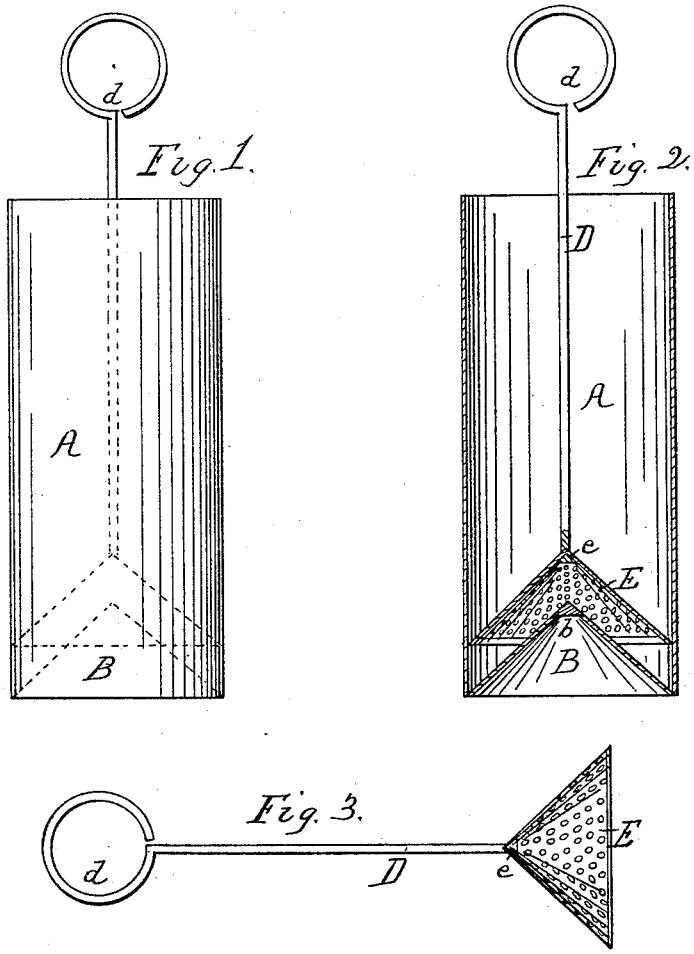

UNITED STATES PATENT OFFICE.

JOHN J. FLETCHER, OF NEWARK, (DAKOTA TERRITORY,) SOUTH DAKOTA.

EGG-BEATER.

SPECIFICATION forming part of Letters Patent No. 442,429, dated December 9, 1890.

Application filed January 3, 1889. Serial No. 295,277. (No model.)

*To all whom it may concern:*

Be it known that I, JOHN J. FLETCHER, a citizen of the United States, residing at Newark, in the county of Marshall and Territory of Dakota, have invented certain new and useful Improvements in Egg-Beaters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in egg-beaters; and it consists in the construction and arrangement of parts fully hereinafter described, and definitely pointed out in the claims.

The object of my invention is to provide a simple, inexpensive, and efficient egg-beater, constructed in such a manner that the labor usually incident to the beating of eggs is greatly diminished and the result obtained greatly improved. I attain this object by the device illustrated in the accompanying drawings, wherein like letters of reference indicate corresponding parts in the several views, and in which—

Figure 1 is a front elevation. Fig. 2 is a vertical section, and Fig. 3 is a detail view of the plunger or agitator.

In the drawings, A represents a cylindrical holder or receptacle, having a conical bottom B extending up into the holder. The apex of the conical bottom is preferably formed with a hard metallic cap $b$. The top of the holder is unobstructed, admitting of a free passage of the agitator. The side walls are perfectly parallel and straight, so as to permit of an uninterrupted reciprocating movement of the agitator. The agitator, as shown in Fig. 3, is composed of a straight handle D, having a ring or loop $d$ on its upper end and a conical beater E on its lower end. The beater E is constructed of metal, having its sides perforated, and is secured rigidly to the lower end of the handle at its apex. Its size corresponds substantially to the size of the conical bottom B, over which it fits, the hardened apex of the bottom striking the under side of the apex of the beater, which is preferably formed with a hard cushion or buffer $e$. The lower edge of the beater is formed in circumference to snugly fit the interior of the holder.

The operation is as follows: The egg is placed in the holder after relieving it of the shell. The agitator is then forced rapidly up and down, forcing the egg through the perforations, thereby dividing and causing a vigorous agitation of the same until the desired result is obtained, the parts $b$ and $e$ preventing injury to the device by the sudden contact of the same.

My object is to effectually prevent undue shocks and injurious concussions to the two cones, and especially to prevent the side of the perforated cone from contacting with the imperforated cone, at the same time to prevent the base of the perforated cone from being spread and binding in the cylinder.

Having thus described my invention, what I claim as new, and desire to secure by Letters Patent, is—

1. The within described and illustrated egg-beater as an improved article of manufacture, consisting of a cylindrical receptacle having an imperforated conical bottom provided with a solid re-enforcing apex $b$, in combination with a vertically-movable perforated cone provided with an interior cushion $e$, arranged vertically coincident with the said re-enforcing apex $b$, as specified.

2. In an egg-beater having male and female cones operating as described, the male cone re-enforced by a solid point and the female cone having a cushion, arranged as and for the purpose described.

In testimony whereof I affix my signature in presence of two witnesses.

JOHN J. FLETCHER.

Witnesses:
J. H. FITZGERALD,
F. H. MOTT.